(12) United States Patent
Stava

(10) Patent No.: US 7,109,439 B2
(45) Date of Patent: Sep. 19, 2006

(54) SHORT CIRCUIT ARC WELDER AND METHOD OF CONTROLLING SAME

(75) Inventor: Elliott K. Stava, Sagamore Hills, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 237 days.

(21) Appl. No.: 10/783,115

(22) Filed: Feb. 23, 2004

(65) Prior Publication Data
US 2005/0184039 A1     Aug. 25, 2005

(51) Int. Cl.
*B23K 9/09* (2006.01)

(52) U.S. Cl. .............................. 219/130.51; 219/130.33

(58) Field of Classification Search ........... 219/130.51, 219/130.5, 130.21, 130.31, 130.32, 130.33
See application file for complete search history.

(56) References Cited

U.S. PATENT DOCUMENTS

| | | | |
|---|---|---|---|
| 4,546,234 A | * | 10/1985 | Ogasawara et al. .... 219/130.51 |
| 4,866,247 A | | 9/1989 | Parks |
| 4,954,691 A | * | 9/1990 | Parks et al. ............ 219/130.21 |
| 5,003,154 A | * | 3/1991 | Parks et al. ............ 219/130.21 |
| 5,148,001 A | | 9/1992 | Stava |
| 5,278,390 A | | 1/1994 | Blankenship |
| 5,961,863 A | * | 10/1999 | Stava ..................... 219/130.51 |
| 6,051,810 A | | 4/2000 | Stava |
| 6,087,626 A | * | 7/2000 | Hutchison et al. ..... 219/130.21 |
| 6,501,049 B1 | | 12/2002 | Stava |

* cited by examiner

*Primary Examiner*—Clifford C. Shaw
(74) *Attorney, Agent, or Firm*—Fay, Sharpe, Fagan, Minnich & McKee, LLP

(57) ABSTRACT

An electric arc welder operated to perform a short circuit welding process between an electrode and a workpiece, where the process comprises a succession of alternate short circuit conditions and arc conditions, with a first current waveform during the short circuit condition and a second voltage waveform during the arc condition. A first waveform generator constructs the first waveform from a series of current pulses controlled by a pulse wave modulator operated at a rate greater than 18 kHz and a second waveform generator constructs the second waveform from a series of current pulses controlled by a pulse wave modulator operated at a rate greater than 18 kHz. The second waveform generator has a circuit to generate the second waveform with a generally constant arc parameter, generally voltage.

36 Claims, 7 Drawing Sheets

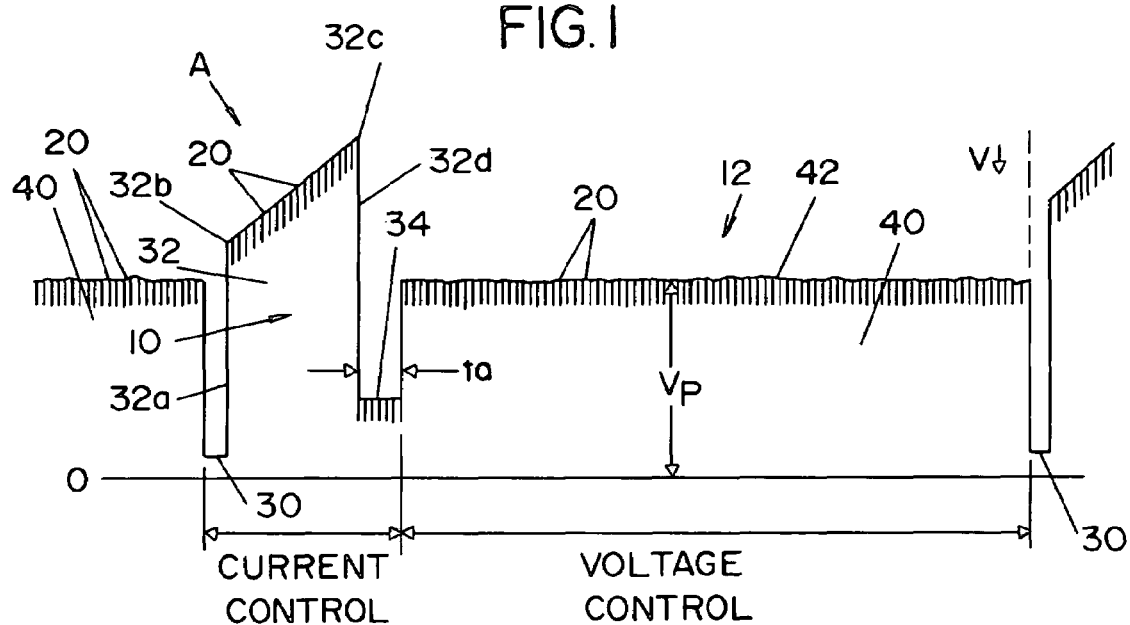
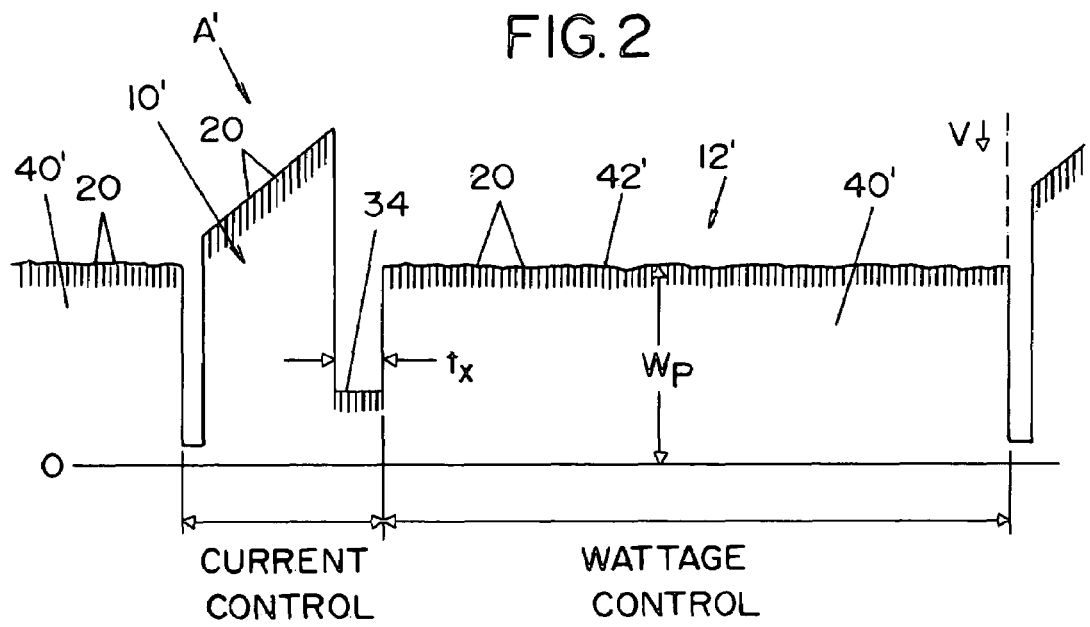

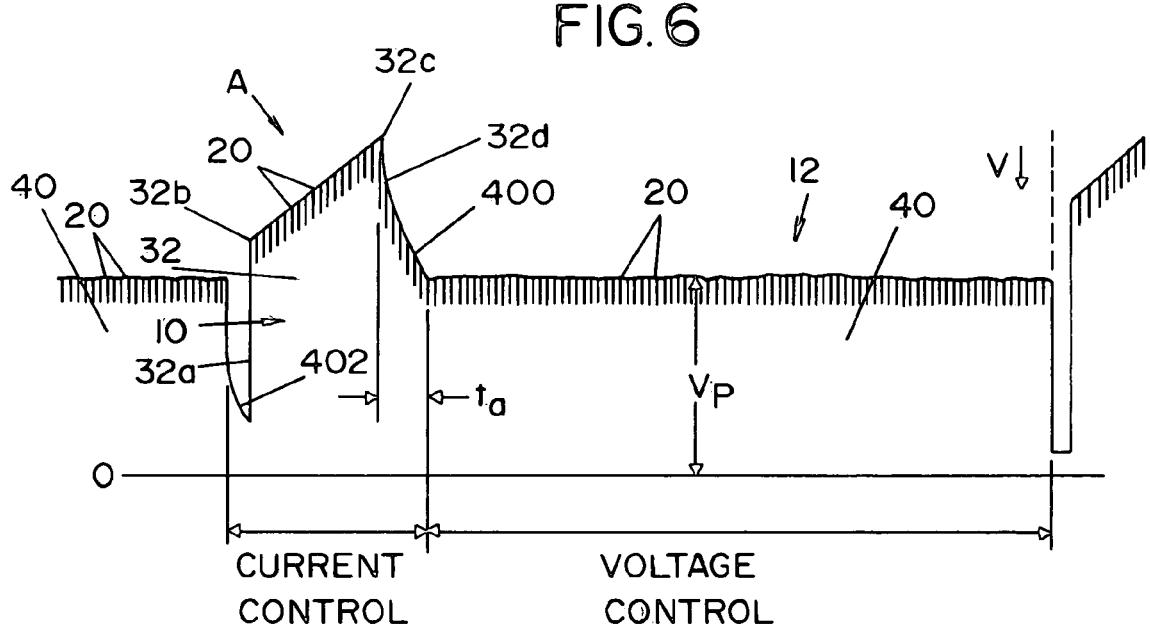
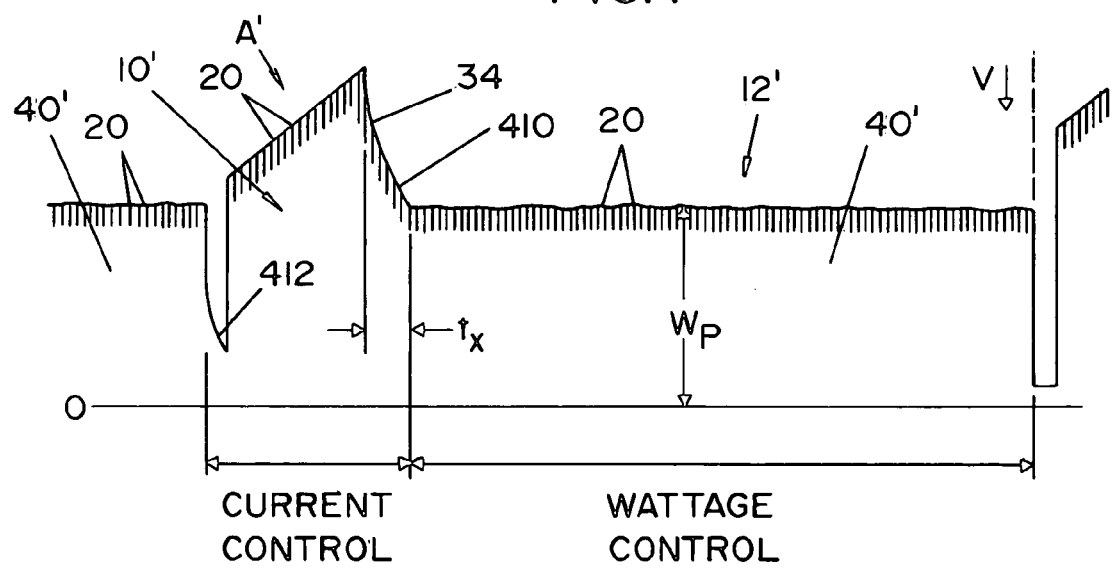

SHORT CIRCUIT ARC WELDER AND METHOD OF CONTROLLING SAME

The invention relates to the art of arc welding and more particularly to an electric arc welder having a unique controller for performing short circuit electric arc welding.

INCORPORATION BY REFERENCE

In the field of electric arc welding of the type especially useful in pipe welding, weld puddle temperature and fluidity are controlled by using a short circuit arc welding process known as STT welding. This technology was developed and patented by The Lincoln Electric Company, and is disclosed in several patents, including Parks U.S. Pat. No. 4,866,247, Stava U.S. Pat. No. 5,148,001 and Stava U.S. Pat. No. 6,051,810. These three patents show STT welding technology in which the present invention is preferably used. Since this technology is well known, incorporation by reference of these patents provides general background information for understanding the implementation of the invention. In practicing STT short circuit welding, a waveform generator produces the precise waveform used in the welding process by creating a series of current pulses the widths of which determine the current flowing in the welding process at precise portions of the cycle. In practicing this type of electric arc welding, as well as other short circuit processes, it is common to use a Power Wave electric arc welder sold by The Lincoln Electric Company. Such inverter based welder is disclosed in Blankenship U.S. Pat. No. 5,278,390. This patent is incorporated by reference to disclose the general type of welder used to implement the present invention. Background technology is disclosed in assignee's patent, Stava U.S. Pat. No. 6,501,049 also incorporated by reference herein.

BACKGROUND OF INVENTION

Electric arc welding is performed in a variety of processes, such as spray welding, globular welding, and short circuit welding. Irrespective of the process employed, an inverter converts three phase line current to the desired voltage or current. An inverter based power supply for electric arc welding has a digitally based control to produce a desired output current or voltage at the arc welding process. In pipe welding, pulse welding or short circuit welding is preferred for the first weld bead, known as the "root pass", that closes the open gap between edges of adjacent workpieces. For best results, the short circuit electric arc welding procedure is implemented by using the patented STT technology. In this technology, a precise current waveform is outputted by the power supply. Spatter reduction is affected by drastically reducing the current just before the shorted metal separates to create a new arc. Thereafter, the current waveform produces a plasma boost for melting the end of the electrode awaiting the next short. The peak current of the plasma boost pulse is gradually reduced in a current tailout until a set background current is reached. Thereafter, the background current is maintained until the molten metal ball shorts against the workpiece causing the next cycle. In this STT electric arc welding process, the current waveform is accurately controlled by a series of current pulses, the widths of which determine the magnitude of the current at any given time in the waveform. The shape of the waveform is controlled by a waveform generator. By using this technique, the current waveform allows control of the puddle temperature and/or fluidity. Such capability is vital in gap welding applications, such as open root pass in pipe welding. If the puddle is too cold, a lack of metal fusion can result. As a corollary, when the puddle is too hot, a poor internal back bead is possible caused by the weld metal "sucking back" into the root. In the past, STT short circuit welding has been implemented as a current control process. If the operator wants to change heat in the arc and/or puddle, he must adjust current by the machine setting.

THE INVENTION

In accordance with the present invention, there is provided an electric arc welder that can function in the STT mode where heat is controlled merely by changing the position of the electrode. As the extension length increases during the arc condition of a short circuit welding process, the heat decreases, and vice versa. The invention is a controller that generates a voltage waveform for the arc portion or condition of a short circuit welding process. Consequently, the power supply is operable in both current and voltage control modes so current control is used when best for the short circuit condition of the welding cycle, while voltage control is used for the plasma or arc condition. Consequently, the current mode of the power supply will use a waveform control that is the same as the STT welder to implement the short circuit condition of the welding cycle. When the molten metal ball on the end of an electrode shorts against the workpiece, a controlled pinch current waveform is implemented. A dv/dt, dr/dt or dt/dt detector determines an impending break or separation of metal from the electrode. Then, a power switch is opened to instantaneously reduce current flow before the electrode separates. This action minimizes spatter. When the short is broken, the arc condition or plasma condition is immediately established. The power supply electronics detects the break in the electrode as an increase in arc voltage. The power supply shifts into the voltage control phase. A voltage waveform is generated to provide a constant arc parameter until the next short circuit is detected to shift the waveform back to a current control for clearing the short circuit. In this voltage mode, current will change due to the desired constant voltage of the voltage waveform. If the voltage control circuitry is precise and the extension length maintained reasonably constant, the welding current will be reasonably constant during the arc or plasma condition. The voltage controlled portion of the welding process has no tailout or a set background voltage to which the voltage transitions to await the next short circuit. By controlling the voltage at a constant level during the arc or plasma condition of the short circuit welding process, the weld puddle temperature and fluidity can be accurately controlled to optimize the welding process and operate in the voltage range of the power supply. This novel technique of using a current waveform during the short circuit condition and a constant voltage waveform during the arc condition is applicable in any short circuit electric arc welding process. The invention merely involves using a controlled constant voltage waveform during the arc or plasma condition of a short circuit welding process. The short condition of the welding process can be controlled in accordance with standard technology or by the precision current waveform used in the STT technology. Such technology uses a switch, such as a Darlington switch, to plunge the short circuit current upon the detection of an imminent break in the metal, known as a "neck." The invention can be used in a modified short circuit process where the switch and "neck" control is not used. The basic aspect of the invention is the current implementation of the short circuit condition with a precision constant voltage waveform for the arc or plasma condition of the welding process.

In accordance with an aspect of the invention, there is provided an electric arc welder operated to perform a short circuit process with a first waveform controlling a short condition followed by a second waveform controlling the arc condition. The welder comprises a comparator to create an arc signal when the short condition terminates. A controller then shifts the welder from control by the first waveform to control by the second waveform. In response to the creation of the arc signal, the second waveform is a precise constant voltage waveform wherein the first waveform is a current waveform which may be somewhat conventional. This is preferably either an STT process or a modified STT process without a premonition circuit. In the broad aspect of the invention, the first waveform is a current controlled waveform and the second waveform is a voltage controlled waveform with a constant voltage. Of course, the second waveform is sometimes a constant wattage control waveform or a constant joules control waveform. Both of these complex parameters are functions of the arc voltage. Of course, the waveforms are implemented as a series of current pulses that define either the current waveform or the constant voltage waveform of the invention.

Another aspect of the invention is the provision of a controller for an electric arc welder operated to perform a short circuit process, with a short condition followed by an arc condition. Such controller has a first current control mode during the short condition and a second control mode distinct from the current control mode during the arc condition. This second control mode is preferably constant voltage. It has been implemented as a wattage in the precise constant waveform and a joules control in a precise constant waveform. The waveform is created in the weld process by a series of current pulses generated or created at a rate exceeding 18 kHz and preferably substantially greater than 20 kHz. In practice, these pulses are created by a pulse width modulator used in a closed loop feedback to control either the current or voltage in accordance with the desired profile outputted from a waveform generator.

Yet a further aspect of the invention is the provision of a method of controlling an electric arc welder operated to perform a short circuit process with a short condition followed by an arc condition. This method comprises employing a first current control mode during the short circuit condition and a second control mode distinct from the current control mode during the arc condition. In practice, this method involves the act of implementing the second control mode as a voltage mode constant parameter process, which process follows a precise constant waveform during the arc condition. The power supply is operated in its voltage range irrespective of the arc resistance.

The primary object of the present invention is the provision of an electric arc welder, controller for the welder, and method of short circuit welding, wherein the arc condition is accurately controlled by a constant parameter waveform, as a function of voltage waveform. This precision control waveform can be constant voltage, constant wattage, which is voltage times current, or constant joules, which is voltage times current integrated. This voltage function control of the arc condition in a short circuit welding process allows precise heat control of the weld puddle during the welding procedure and operation in the voltage range of the power supply.

Another object of the present invention is the provision of a welder, controller and method, as defined above, which welder, controller and method can be implemented by a single power supply and used for standard short circuit welding and/or STT short circuit welding.

Yet another object of the present invention is the provision of a welder, controller and method, as defined above, which welder, controller and method employs the advantages of current control during the short condition and the advantages of voltage control during the arc condition, where the voltage control forms a constant parameter waveform.

These objects and advantages will become apparent from the following description taken together with the accompanying drawings.

BRIEF DESCRIPTION OF DRAWINGS

FIG. 1 is a graph showing the waveforms used in practicing the preferred embodiment of the present invention;

FIG. 2 is a graph similar to FIG. 1 wherein the waveform is a complex function of voltage, i.e. wattage or joules;

FIG. 9 is a block diagram of the program or analog components to shift between the modes of operation for waveforms constituting the welding process of the present invention; and, FIG. 10 is a wiring diagram to generate the current waveform of FIG. 11; and, FIG. 11 is a current waveform graph using current control; and.

PREFERRED EMBODIMENT OF THE INVENTION

Figure 3:
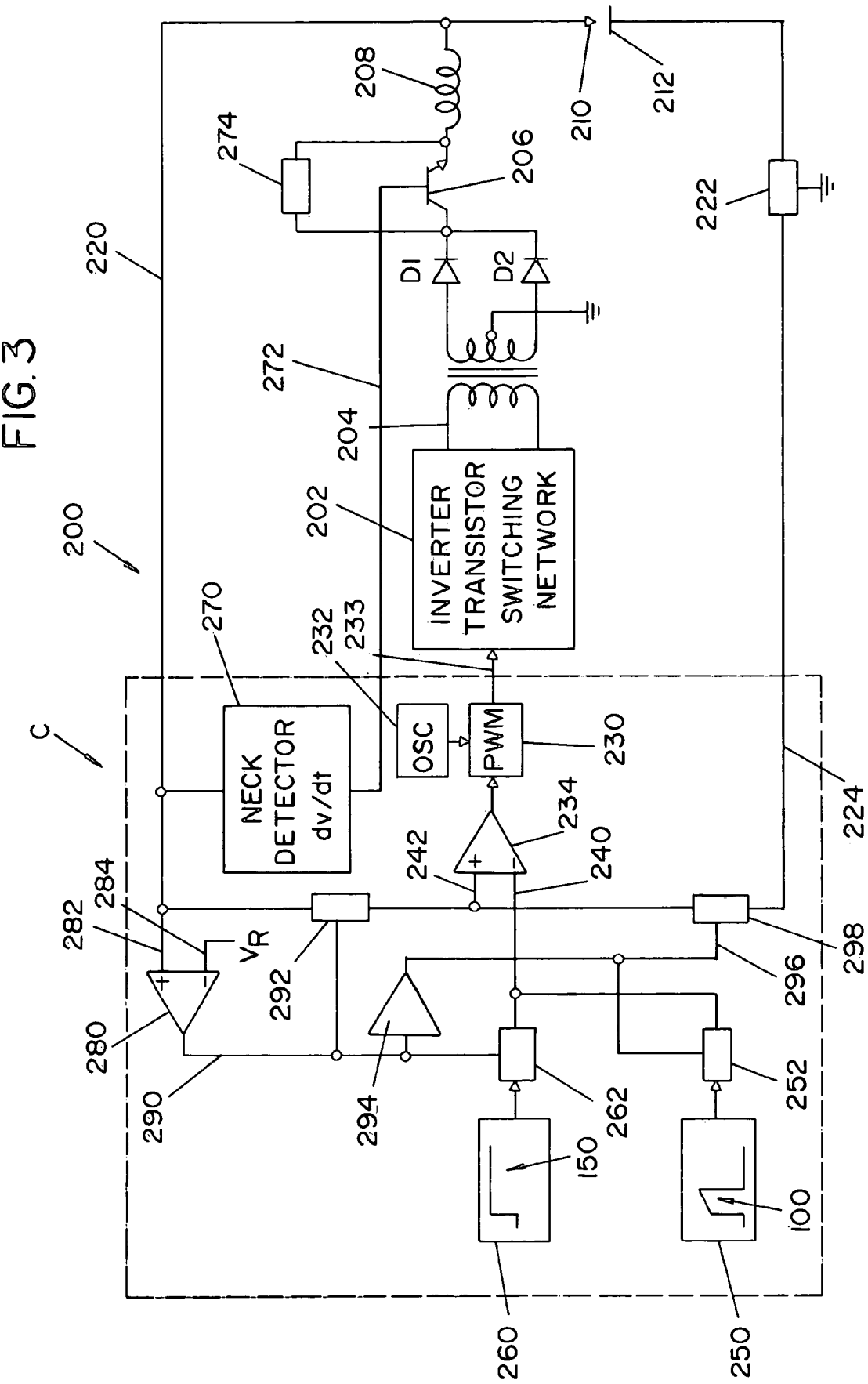
FIG. 3 is a block diagram and logic chart illustrating the techniques used in the preferred embodiment of the present invention.

Referring now to the drawings wherein the showings are for the purpose of illustrating a preferred embodiment of the invention only, FIG. 1 shows an STT type waveform A for a short circuit welding process including a short condition 10, and an arc condition 12 with constant parameter, shown as a constant voltage. This waveform is the current profile through the weld and is formed by a plurality of current pulses 20 created at a frequency exceeding 18 kHz. The widths of the current pulses control the magnitude or height of the waveform as illustrated in FIG. 1. Short circuit welding includes alternating between an arc or plasma condition 12 and a short condition 10 initiated at the time a molten metal ball on the end of an electrode contacts the workpiece. This event occurs at time 30. Metal is then transferred from the electrode to the workpiece by surface tension action. This action is accelerated by pinch pulse 32 used to control the current with a profile having a rapidly increasing current section 32a, a break point 32b to give a second slope, and a premonition point 32c. As will be explained later, a dv/dt, dr/dt or dp/dt circuit detects when the surface tension transfer of molten metal is ready to separate or explode. At that time, the voltage increases because the cross section decreases rapidly. This event anticipates the explosion or separation of the molten electrode tip from the workpiece. To reduce spatter, the waveform includes a current plunge section 32d before actual metal separation. Current pinch pulse 32 is controlled in the STT technology by the shape of pinch pulse 32 shown in FIG. 1. Thereafter, there is a slight delay 34 indicated to be time $t_x$ before the current rapidly increases to create plasma pulse 40. In the STT technology, this rapid increase in current is toward a fixed peak current. In the present invention, the controller shifts the power supply between current control during the short condition and to voltage control during the arc condition 12. This causes a current increase in the plasma constant parameter pulse 40 of a voltage function. Such a constant voltage waveform of FIG. 1 normally produces a generally constant current. The desired amount of energy is transmitted to create a molten metal ball awaiting a shot at time 30. In the present invention, the waveform implemented during arc condition 12 is a voltage waveform having a constant voltage $V_p$ and then a short circuit. At the end of the constant voltage waveform, there is a new short at time 30 causing the voltage to plunge and shift the power supply to a current control for the pinch pulse 32. Thus, the invention involves using current control during the short condition 10 and voltage control during arc position 12. In each instance, these controls follow predetermined waveforms to produce the desired characteristics. Consequently, the arc condition 12 is a voltage function. In the preferred embodiment, the voltage function is the voltage across the arc. As will be explained later, a standard closed loop control operated during the short condition to create a desired presized, preselected waveform during condition 10, shown as waveform 100 in FIG. 3. The same concept, i.e. current control during the short condition and voltage function control during condition 12', is used in the second embodiment of the invention illustrated in FIG. 2. Waveform A' includes a short condition 10' and an arc condition 12'. The voltage function used during condition 12' for closed loop control is wattage. The plasma pulse 40' is a constant waveform 150 as shown in FIG. 3. The voltage function is sometimes joules, so a joules closed loop feedback produces a waveform as shown in FIGS. 1 and 2.

Utilizing a pulse width modulated, inverter based power supply of the type used in the preferred embodiment of the present invention results in the current and voltage curves schematically illustrated in FIG. 3. Current waveform 100 in the classic STT form, plunges at time 30 when the molten metal ball is shorted to the workpiece causing the voltage to plunge. Such voltage decrease is to a level less than a reference voltage $V_R$ causing the power supply to shift from voltage control of plasma condition 12 to current control of short circuit condition 12. Current control implements the short circuit condition of the weld cycle. The current is held down for a short time until the current is allowed to increase. Thus, current control of the power supply is then released allowing a rapid increase in the current at position 32a to create pinch pulse 32 having a break point 326 and a premonition point 32c. As previously explained, the current control of the power supply plunges the current as indicated by portion 32d. Thus, the explosion or metal separation occurs at the low current 34 that is maintained for a time $t_a$.

During this time, the current mode of operation allows an increase in voltage to create current pulse 40 which current has a waveform 150 dictated by the predesigned constant voltage control waveform. Current pulse 40 has a steep, leading edge while current is advancing toward the constant level of pulse 40. This current level is caused by the set peak voltage portion of waveform 150 used during voltage control of the power supply. Thereafter, current pulse 40 remains constant until time 30. Pulse 40 is a current pulse with a shape dictated by the desired voltage waveform 150 shown in FIG. 3. Current control defines pulse 10 with waveform 100 and voltage control defines pulse 40 with waveform 150. At point 30, the voltage control experiences a short circuit and control is shifted from voltage to current. Thereafter, a low current is maintained until time 32a. Current pulse 10 is then created by the desired current waveform 100. The power supply maintains the desired shape of pinch pulse 32. Voltage immediately rises along portion 160a as a result of the desired current. At break point 32b, the voltage transitions along the top line until portion 32c where the voltage is plunged along line 32d in response to the standard premonition signal. This is still in the current control mode. The shorted electrode separates at time 32d, causing the voltage to increase to a level above reference $V_R$ causing the power supply to shift to a voltage control waveform 150 as the arc voltage obtained when arc is reestablished at low current 34. This next waveform 150 includes constant voltage 42. To reach the peak voltage 42, there is a short time. This short time plus the actual delay equals the previously discussed delay 34 having a time $T_x$. This control is standard practice in STT welders. After processing of the voltage waveform 150 to melt the electrode, voltage 42 is held awaiting the next short circuit. In practice, 100 to 300 cycles of pulses shown in FIG. 3 are performed each second. By adjusting constant voltage 42, the temperature and/or fluidity of the weld puddle is controlled.

In practicing the invention, the preferred embodiment employs a digital control scheme illustrated in block diagram and logic FIG. 3 wherein welder 200 has a logic processor based controller C programmable to implement a short circuit arc welding process, such as an STT short circuit welding process. Inverter 202 has a standard rectified output circuit 204 for directing current through switch 206 and inductor 208 to electrode 210 in the form of an advancing wire used to weld workpiece 214. Voltage feedback 220 directs the level of the arc voltage back to digital controller C. In a like manner, shunt 222 directs the instantaneous arc current back to controller C by feedback line 224. In accordance with standard control technology, the logic processor in controller C includes a digitally implemented pulse width modulator 230 having an input digitized error amplifier 234 with a waveform control represented by line 240. Pulse width modulator 230 causes inverter 202 to follow the waveform on line 240 based upon the feedback value in line 242. In accordance with standard practice, current waveform generator 250 is provided to give the desired profile of the current pulse between the electrode and workpiece during various portions of the weld cycle. Oscillator 232 is set at a frequency of at least 18 kHz so pulses in line 233 have this high frequency. In this invention, current waveform generator 250 is used by pulse modulator 230 for only a portion of the time or segment of the weld cycle as determined by the conductive state of digital enable switch 252. When the switch is enabled, generator 250 controls the logic on line 240 so that the feedback level on line 242 follows the desired precise current profile or waveform 100 shown as a standard STT waveform as used in the field. In accordance with the invention, a voltage waveform generator 260 is also provided to generate a constant waveform 150. Generator 260 has an output directed through digital enable switch 262 to input 240. Switch 252 and switch 262 are anti-coincident. When one enable switch is closed, the other enable switch is opened. Thus, error amplifier 234 receives a waveform generated from either the current waveform generator 250 or the voltage waveform generator 260 (waveform 150), according to the conductive condition of switch 252, 262. In accordance with standard STT technology, a premonition circuit 270, indicated as a dv/dt circuit, creates a logic in line 272 for opening switch 206 when the metal transfer is near the breaking point. Resistor 274 is then inserted into the weld circuit to reduce current along portion 32c. To shift between the current mode and voltage mode, a digitized comparator 280 has a positive input 282 connected with the voltage feedback 220 and a negative input 284 controlled by reference voltage $V_R$. Output line 290 of comparator 280 is connected to a voltage mold digital switch 292. The logic on line 290 is inverted by inverter 294 to provide the opposite logic on line 296 for controlling current mode switch 298. In operation, when the voltage decreases on line 222 at the start of a short, a logic zero appears in line 290. This deactivates switch 292 and switch 262. Inverter 294 produces a logic 1 in line 296. This activates switch 298 so the current feedback level in line 224 is directed to input 242 of error amplifier 234. At the same time, the logic 1 on line 296 enables digital switch 252 so waveform generator 250 is connected to input 240 of the error amplifier. During this operation, the inverter 220 follows waveform 100 from generator 250. At the end of the short, the arc voltage increases rapidly. Then, the value on input 282 exceeds the reference voltage on line 284. A logic 1 is created in line 290 for closing voltage mode switch 292 and enabling switch 262 so generator 260 controls the logic on line 240. At this same time, switches 252 and 298 are deactivated. The feedback voltage signal on line 220 is directed through switch 292 to input 242. In this manner, inverter 202 follows waveform 150 of constant voltage waveform 150 created by generator 260. This generator could also be a constant wattage waveform generator or a constant joules waveform generator. All of these iterations have been practiced to control the arc condition of the short circuit welding process. The logic scheme disclosed in FIG. 3 is processed by digital technology in controller C and a variety of digital techniques can be used to accomplish the objective of generally operating the arc condition by a waveform tracking the desired function of voltage as a constant plasma parameter. In the past, the waveform during the arc condition has been merely an extension of the short circuit waveform so that the advantage of controlling the arc as a voltage function was not available.

Figure 3A:
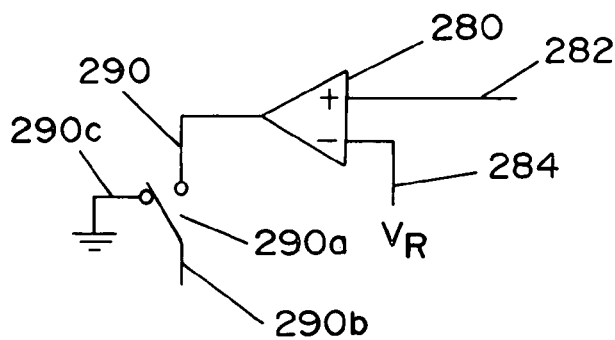
FIG. 3A is a partial logic diagram showing the current override switch used at a selected position at the end of the arc condition.

In some situations, after the molten ball has been formed, it is desirable to shift to current control during the arc condition. A digital switch is employed where the logic processor opens line 290 by a switch 290a illustrated in FIG. 3A. This two pole switch concept grounds line 290b by ground 290c. This places a logic zero on line 290b to shift the switches to current control. This switch action is selected by the logic processor after a molten ball is formed by the plasma pulse 40.

Figure 4:
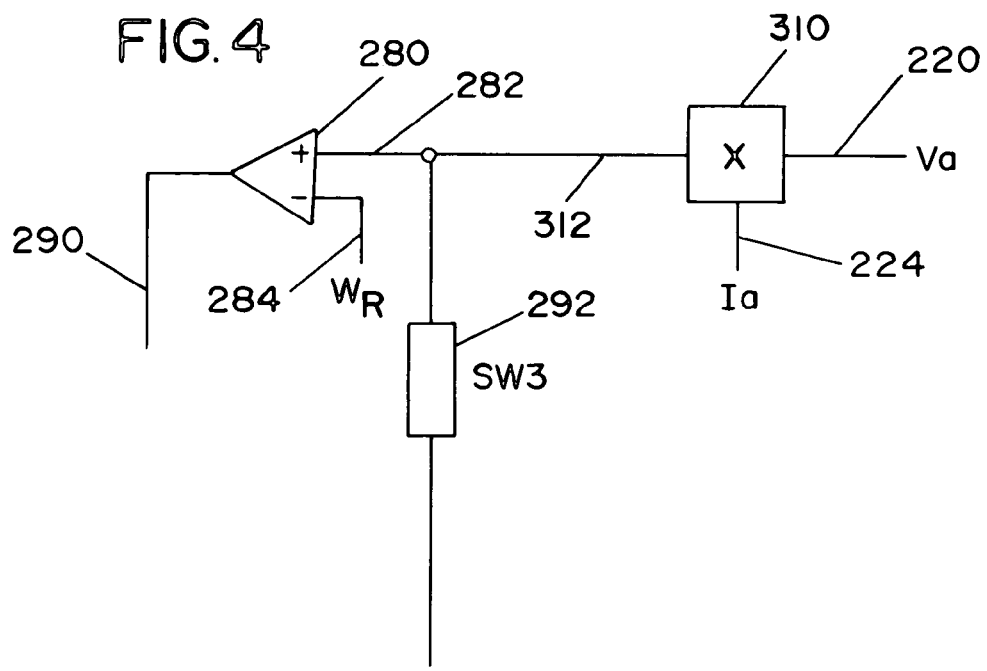
FIG. 4 is a partial logic diagram for modification of the block diagram and logic chart in FIG. 3.
Figure 5:
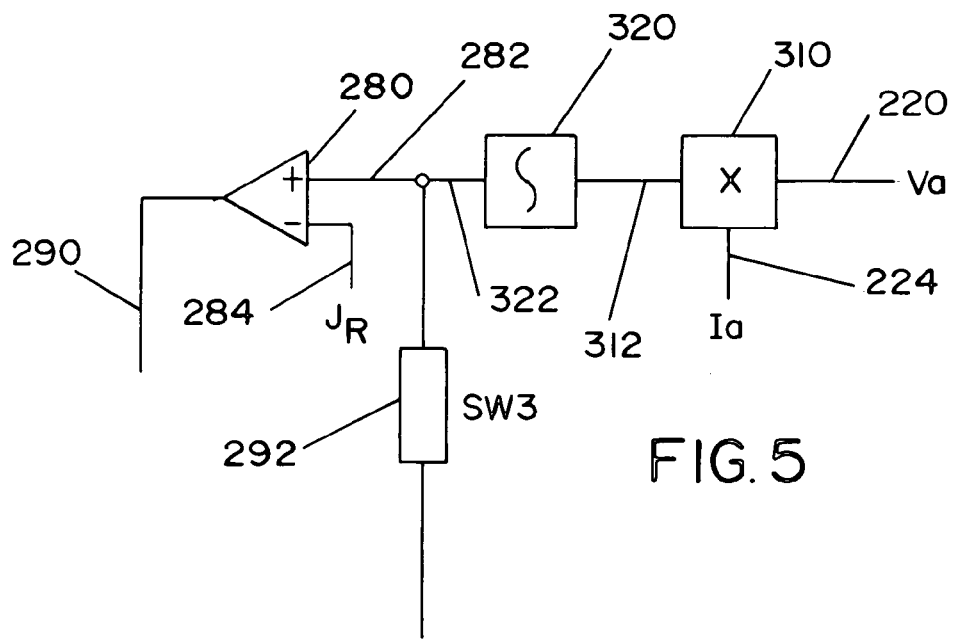
FIG. 5 is a partial logic diagram of a further modification of the implementation of the invention as shown in FIG. 3; and, FIGS. 6 and 7 show waveform graphs similar to FIGS. 1 and 2 using a modified STT waveform during the short circuit condition of the welding process.

FIGS. 4 and 5 illustrate slight modifications of the block diagram and logic chart of FIG. 3. In FIG. 4, the voltage function is constant wattage; therefore, the inputs of line 282 of comparator 280 is the product of the voltage feedback on line 220 and current feedback on line 224. These values are combined by the multiplier 210 to produce a value in line 312 representing the wattage feedback. The current feedback 224 is used at the input of switch 298 as previously shown in FIG. 3. By using the slight modification shown in FIG. 4 for the digital processing in controller C, the arc condition has a constant wattage waveform controlled by a wattage feedback, while the short condition is controlled as shown in FIG. 3 by a current feedback. In FIG. 5, the product in line 312 is integrated by integrator 320 to produce a joules feedback in line 322. This is directed to the positive input 282 of comparator 280 and to the input of switch 292 so the arc condition is controlled by a constant joules waveform that is a precise reflection of the desired joules waveform 150. Other such changes in the digital processing schematically illustrated in FIG. 3 can be used so long as the pulse portion of the arc condition is controlled by a waveform 150 that is a precise representation of a desired voltage function. The voltage rating of the CV power source will not be exceeded by anomalies in the welding process.

Figure 8:
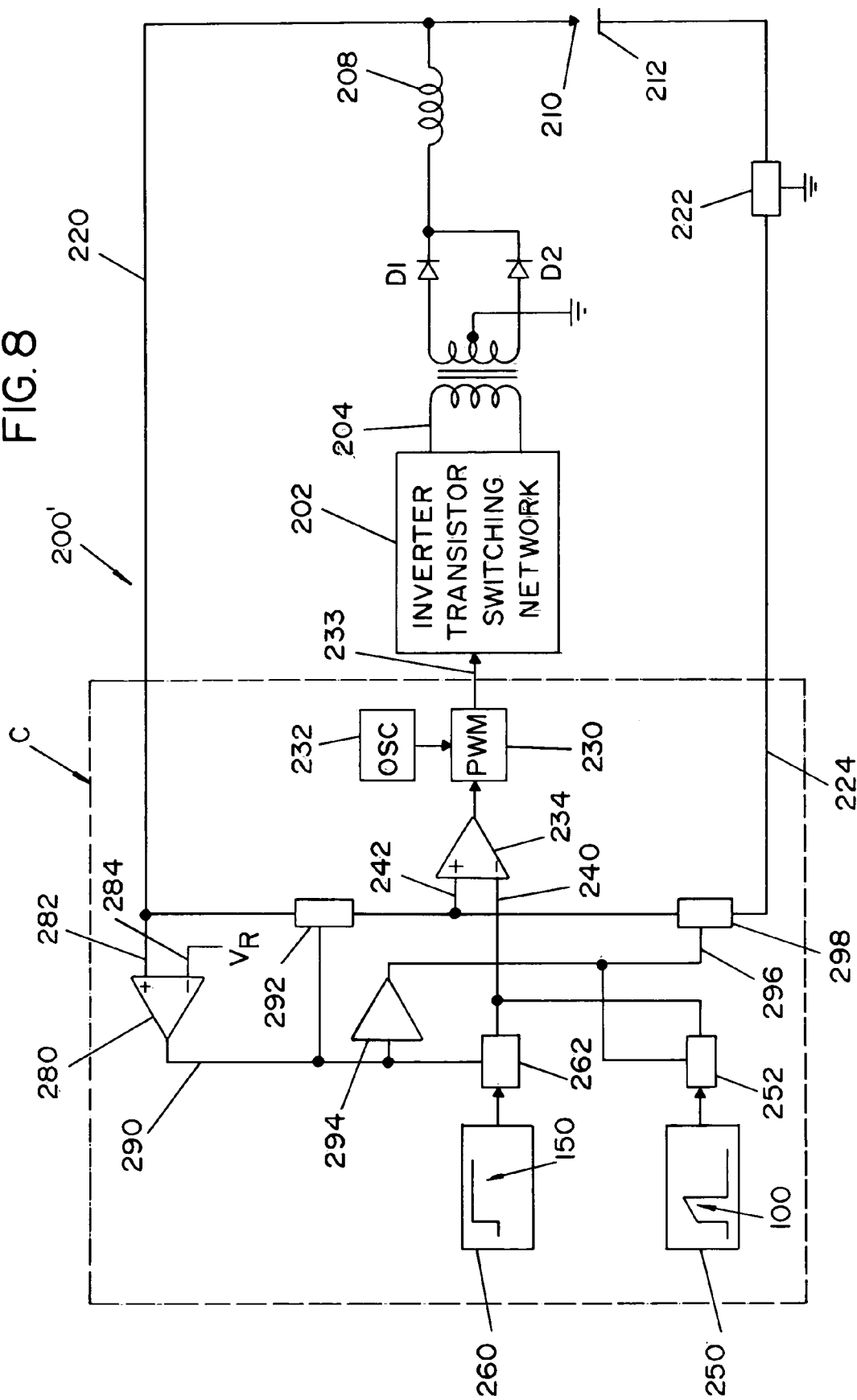
FIG. 8 is a block diagram and logic chart illustrating the techniques used in the embodiment of the present invention for creating the waveform shown in FIGS. 6 and 7.

Referring now to FIGS. 6–8, a modification of welder 200 is illustrated. The modified welder 200' is a modified STT welder wherein Darlington switch 206 and the neck premonition circuit 270 are removed. This modified circuit produces the waveform as shown in FIGS. 6 and 7 with the same numbers as corresponding portions of waveforms illustrated in FIGS. 1 and 2, respectively. By removing the Darlington switch, inductor 208 controls the drop in current from the bread point 32c to the constant voltage waveform 40 to shift along the rapid time constant curve 400. This is a modified STT curve. With this modification, the shift at the short circuit condition 30 is along a time constant curve 402. In a like manner, the waveforms shown in FIG. 7 have a transition curve 410 and an introduction transition curve 412. These slight modifications of the preferred embodiment of the present invention allow the advantage of the present invention without necessarily employing the same STT welding process popularized by The Lincoln Electric Company of Cleveland, Ohio. Other modifications in the welder beyond the changes in FIG. 8 could be made to practice the invention which is to control the short circuit condition of the welding process by a current waveform and the plasma or arc condition of the waveform by a constant parameter waveform.

Figure 9:
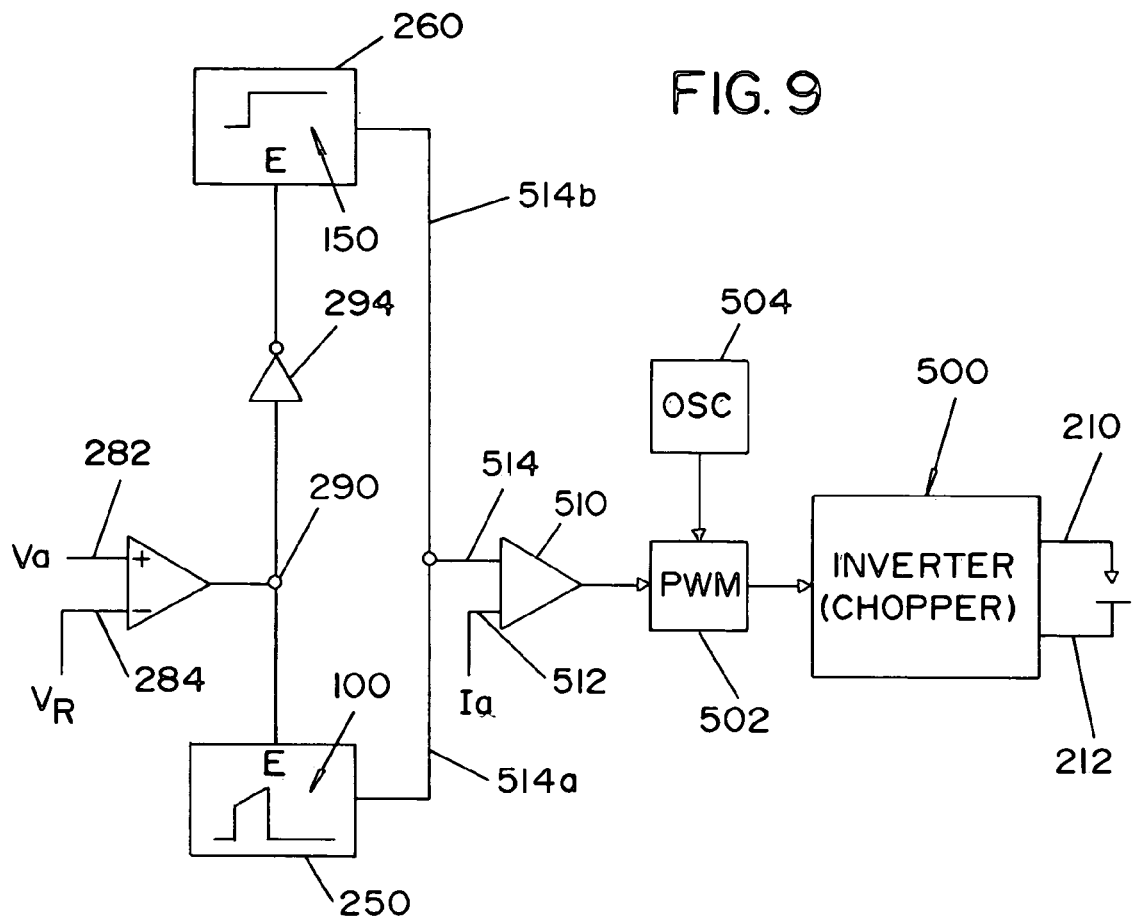

A simplified illustration of the implementation of the present invention is illustrated in FIG. 9 wherein inverter 500 or an equivalent chopper has waveforms controlled by pulse width modulator 502 operated at a frequency in excess of 18 kHz by oscillator 504. Error amplifier 510 has a feedback input 512 from the arc current sensing device and a control input 514 connected to waveform generator 250 by line 514a and generator 260 by line 514b. The arc voltage on line 282 determines the profile of the waveform is being transmitted to pulse width modulator 502. In accordance with standard practice, the premonition circuit overrides the shift to a plasma condition. It occurs in advance of the arc condition. The logic on line 282 controls the particular waveform 100 or 150 being processed by inverter 500. This general system is used in performing the welding processes shown in FIGS. 1, 2 and 6, 7.

Figure 10:
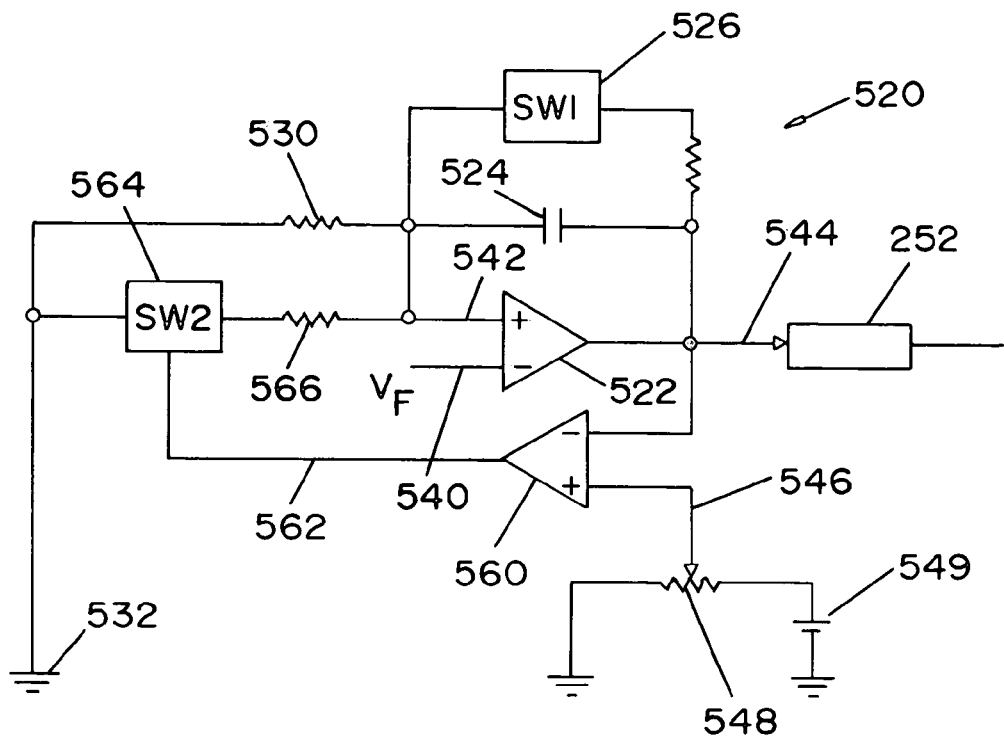
Figure 11:
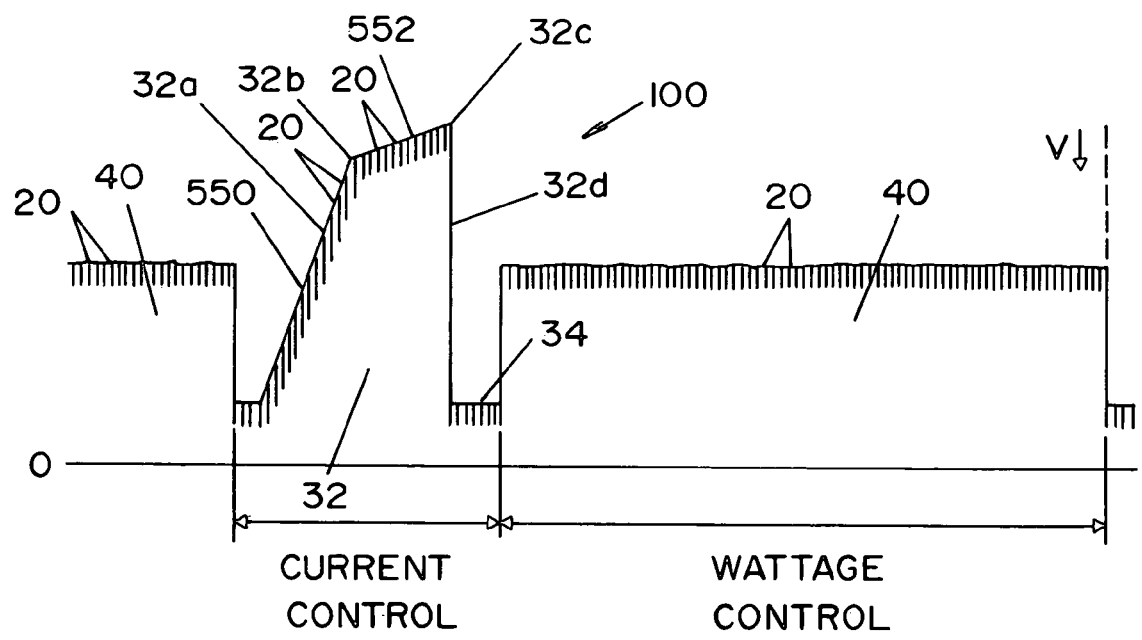

A further aspect of the invention is shown in FIGS. 10 and 11 where the two slope configuration waveform 100 is shown in more detail. This waveform is used in a welder wherein waveform 100 is current control and waveform 150 is controlled differently, i.e. by voltage. When using two separate control modes for each waveform of the weld process it is advantageous to assure the current waveform has a shape as obtained by circuit 520 constituting control of generator 250 in FIGS. 3 and 8. Circuit 520 includes integrator amplifier 522 controlled by discharge of capacitor 524 when switch 526 is open indicating there is no arc. This is during waveform 100. Capacitor 524 is discharged through resistor 530 to ground 532 during the first portion 550 of waveform 100 as shown in FIG. 11. Integrator 522 has an input reference 540 and a control input 542. The integrator assures first portion 550 is generally a straight line as capacitor 524 discharges. When output 544 reaches the break point current 32*b* set by the voltage on input 546 from manually adjusted by rheostat 548 operated by battery 549, comparator 560 provides a signal in line 562 to close switch 564. This places resistor 566 in parallel with resistor 530 to increase the discharge rate of capacitor 524. Thus, after break point 326, the slope of portion 552 is reduced, as shown in FIG. 11. Current waveform 100 is terminated by a necking signal in line 272 or by the current on line 544 reaching a set value, normally 550 amperes. This is done by a standard maximum current circuit not shown. By using the two slope current pulse, the use of a constant voltage pulse waveform 150 does not affect the short circuit control of the arc welder.

Figure 12:
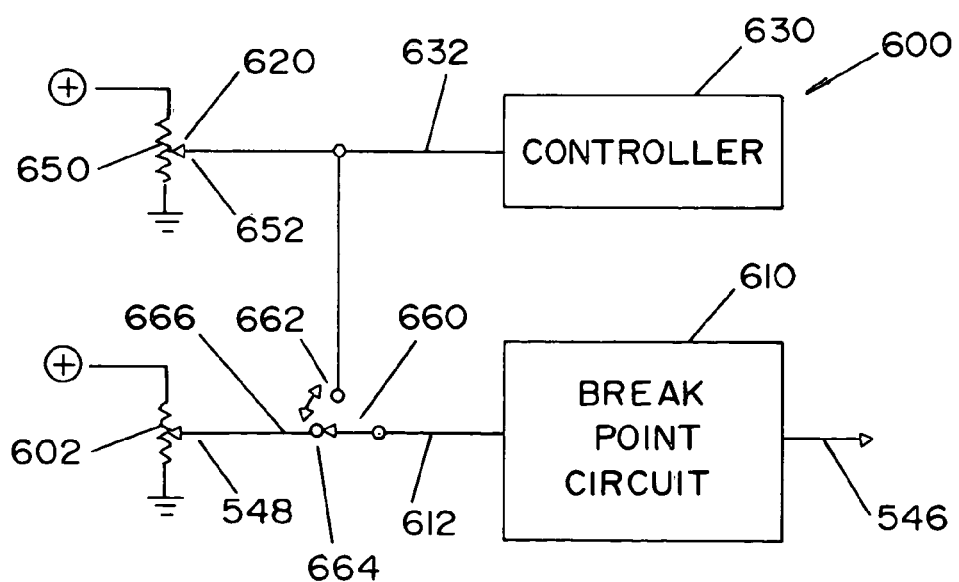
FIG. 12 is a block diagram of a break point circuit constructed in accordance with an aspect of the present invention.

In accordance with an aspect of the invention, the electric arc welder using waveform technology has a current break point adjusting circuit 600 as shown schematically in FIG. 12. A standard manually adjusting element 548 uses rheostat 602 to input a break point level signal ito circuit 610 by line 612. Thus, set point 32*b* is manually adjusted. The invention involves use of manually adjustable parameter circuit 620 that adjusts a parameter of the arc welder controller 630 by the signal on line 632. the parameter circuit is preferably the voltage circuit 650 adjusted by knob 652. Switch 660 is movable between terminals 662, 664 to either connect the signal in line 632 or 666 to input 612. This sets the break point of the short circuit current waveform. Other parameters could be used to adjust the set point, such as wire feed speed.

The various components can be combined as desired to construct an electric arc welder.

Having thus defined the invention, the following is claimed:

1. In an electric arc welder operated to perform a short circuit welding process between an electrode and a workpiece, said process comprising a succession of alternate short circuit conditions and arc conditions, with a first waveform during said short circuit condition and a second waveform during said arc condition, a first waveform generator to construct said first waveform from a series of current pulses controlled by a pulse wave modulator operated at a rate greater than 18 kHz and a second waveform generator to construct said second waveform from a series of current pulses controlled by a pulse wave modulator operated at a rate greater than 18 kHz, the improvement comprising: said first waveform generator having a circuit to generate said first waveform as a current control signal and said second waveform generator having a circuit to generate said second waveform, with a generally constant arc parameter, as one of a constant voltage signal or a constant wattage signal, wherein said first waveform generator and said second waveform generator are configured to operate in a generally sequential fashion with respect to each other.

2. The improvement as defined in claim 1 including a voltage detector device with a circuit to sense the arc voltage between said electrode and said workpiece and a circuit to shift said weld process from said short circuit condition to said arc condition upon creation of an arc signal from said detector device when said sensed voltage is greater than a given value.

3. The improvement as defined in claim 2 wherein said welder includes an arc switch in series with said electrode and said workpiece, a resistor in parallel with said arc switch and a circuit to open said arc switch upon creation of said arc signal.

4. The improvement as defined in claim 3 including an inductor in series with said arc switch.

5. The improvement as defined in claim 4 including a circuit for creating a neck signal upon an impending break in a short circuit during said short circuit condition and a circuit to override said arc signal by said neck signal.

6. The improvement as defined in claim 4 wherein said first current control waveform includes a first slope, a break point and then a second slope.

7. The improvement as defined in claim 3 including a circuit for creating a neck signal upon an impending break in a short circuit during said short circuit condition and a circuit to override said arc signal by said neck signal.

8. The improvement as defined in claim 3 wherein said first current control waveform includes a first slope, a break point and then a second slope.

9. The improvement as defined in claim 2 wherein said first current control waveform includes a first slope, a break point and then a second slope.

10. The improvement as defined in claim 1 including a voltage detector device with a circuit to sense the arc voltage between said electrode and said workpiece and a circuit to shift said weld process from said short circuit condition to said arc condition upon creation of an arc signal from said detector device when said sensed voltage is greater than a given value.

11. The improvement as defined in claim 10 wherein said welder includes an arc switch in series with said electrode and said workpiece, a resistor in parallel with said arc switch and a circuit to open said arc switch upon creation of said arc signal.

12. The improvement as defined in claim 11 including an inductor in series with said arc switch.

13. The improvement as defined in claim 12 including a circuit for creating a neck signal upon an impending break in a short circuit during said short circuit condition and a circuit to override said arc signal by said neck signal.

14. The improvement as defined in claim 11 including a circuit for creating a neck signal upon an impending break in a short circuit during said short circuit condition and a circuit to override said arc signal by said neck signal.

15. The improvement as defined in claim 1 including a voltage detector device with a circuit to sense the arc voltage between said electrode and said workpiece and a circuit to shift said weld process from said short circuit condition to said arc condition upon creation of an arc signal from said detector device when said sensed voltage is greater than a given value.

16. The improvement as defined in claim 15 wherein said welder includes an arc switch in series with said electrode and said workpiece, a resistor in parallel with said arc switch and a circuit to open said arc switch upon creation of said arc signal.

17. The improvement as defined in claim 16 including an inductor in series with said arc switch.

18. The improvement as defined in claim 17 including a circuit for creating a neck signal upon an impending break in a short circuit during said short circuit condition and a circuit to override said arc signal by said neck signal.

19. The improvement as defined in claim 16 including a circuit for creating a neck signal upon an impending break in a short circuit during said short circuit condition and a circuit to override said arc signal by said neck signal.

20. The improvement as defined in claim 1 including a voltage detector device with a circuit to sense the arc voltage between said electrode and said workpiece and a circuit to shift said weld process from said short circuit condition to said arc condition upon creation of an arc signal from said detector device when said sensed voltage is greater than a given value.

21. The improvement as defined in claim 20 wherein said welder includes an arc switch in series with said electrode and said workpiece, a resistor in parallel with said arc switch and a circuit to open said arc switch upon creation of said arc signal.

22. The improvement as defined in claim 21 including an inductor in series with said arc switch.

23. The improvement as defined in claim 22 including a circuit for creating a neck signal upon an impending break in a short circuit during said short circuit condition and a circuit to override said arc signal by said neck signal.

24. The improvement as defined in claim 21 including a circuit for creating a neck signal upon an impending break in a short circuit during said short circuit condition and a circuit to override said arc signal by said neck signal.

25. The improvement as defined in claim 20 wherein said first current control waveform includes a first slope, a break point and then a second slope.

26. The improvement as defined in claim 1 wherein said first current control waveform includes a first slope, a break point and then a second slope.

27. An electric arc welder operated to perform a short circuit welding process between an electrode and a workpiece, said process comprising a succession of alternate short circuit conditions and arc conditions, with a first current controlled waveform during said short circuit condition and one of a second constant voltage controlled waveform or a second constant power controlled waveform during said arc condition, a first waveform generator to construct said first waveform from a series of current pulses controlled by a pulse wave modulator operated at a rate greater than 18 kHz and a second waveform generator to construct said second waveform from a series of current pulses controlled by a pulse wave modulator operated at a rate greater than 18 kHz, wherein said first waveform includes a first slope, a break point and then a second slope.

28. The electric arc welder as defined in claim 27 including a voltage detector device with a circuit to sense the arc voltage between said electrode and said workpiece and a circuit to shift said weld process from said short circuit condition to said arc condition upon creation of an arc signal from said detector device when said sensed voltage is greater than a given value.

29. The electric arc welder as defined in claim 28 wherein said welder includes an arc switch in series with said electrode and said workpiece, a resistor in parallel with said arc switch and a circuit to open said arc switch upon creation of said arc signal.

30. The electric arc welder as defined in claim 29 including an inductor in series with said arc switch.

31. The electric arc welder as defined in claim 28 including a break point circuit to manually adjust the current level of said break point in response to a control signal.

32. The electric arc welder as defined in claim 31 wherein said break point circuit includes a circuit to create a voltage signal manually adjustable to change the voltage of said second waveform and a switch to apply said voltage signal as said control signal.

33. The electric arc welder as defined in claim 27 including a break point circuit to manually adjust the current level of said break point in response to a control signal.

34. The electric arc welder as defined in claim 33 wherein said break point circuit includes a circuit to create a voltage signal manually adjustable to change the voltage of said second waveform and a switch to apply said voltage signal as said control signal.

35. An electric arc welder operated to perform a short circuit welding process between an electrode and a workpiece, said process comprising a succession of alternate short circuit conditions and arc conditions, with a first current controlled waveform during said short circuit condition, a first waveform generator to construct said first waveform from a series of current pulses controlled by a pulse wave modulator operated at a rate greater than 18 kHz, wherein said first waveform includes a first slope, a break point and then a second slope, and a break point circuit to set the current of said break point in response to an input signal, a first manually adjustable input signal for said break point circuit, a second manually adjustable input signal for said break point circuit and a switch to connect one of said input signals to said break point circuit, wherein the first manually adjustable input signal represents a first circuit parameter and the second manually adjustable input signal represents a second circuit parameter, the first circuit parameter and second circuit parameter being different from each other.

36. An electric arc welder as defined in claim 35 wherein said second circuit parameter is the voltage of said welder.

* * * * *